Nov. 7, 1933.    C. W. HANSELL    1,934,061
ELECTROMECHANICAL RESONATOR
Filed April 8, 1929

INVENTOR
CLARENCE W. HANSELL
BY
ATTORNEY

Patented Nov. 7, 1933

1,934,061

UNITED STATES PATENT OFFICE 1,934,061

ELECTROMECHANICAL RESONATOR

Clarence W. Hansell, Rocky Point, N. Y., assignor to Radio Corporation of America, a corporation of Delaware Application April 8, 1929. Serial No. 353,285

12 Claims. (Cl. 250—36)

This invention relates to a mechanical oscillator and deals more specifically with an electro-mechanical oscillator having its frequency controlled by the period of mechanical vibration of a metal rod.

The principle of magnetostriction has been applied to oscillating rods to convert electrical energy into mechanical energy and vice versa; the electrical reaction of the mechanical vibrations of said rod being utilized to give certain predetermined reactions upon an electrical circuit; such as, for example, maintaining constant the frequency of oscillation of a vacuum tube oscillation generator, in accordance with the principles of the piezo-electric crystal frequency control shown in the Cady Patent 1,472,583.

In connection with the use of devices of this nature utilizing the principles of magnetostriction, difficulty is experienced in obtaining materials which are sufficiently active to give the desired results in actual operation.

It is therefore an object of this invention to devise a mechanical oscillator which can utilize any magnetic material as the vibrating element.

It is a further object of this invention to provide a mechanical oscillator which is highly efficient in its operation but which is simple and cheap to construct.

Further, it is an object of this invention to provide an electro-mechanical oscillator in which increased forces acting upon the rod may be realized.

And finally, it is a further object of this invention to provide an electro-mechanical oscillator which does not rely upon either the piezo-electric effect or the principles of magnetostriction for its operation.

These and other objects of the invention will be readily apparent to those skilled in the art from the following description taken in connection with the accompanying drawing in which.

Figure 1:
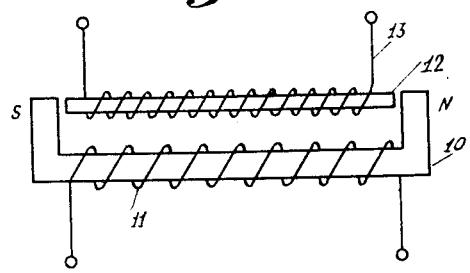
Fig. 1 is a diagrammatic representation of an electro-mechanical oscillator constructed in accordance wth the principles of this invention.

Referring in detail to Fig. 1, the electro-mechanical oscillator or resonator is seen to comprise a magnet 10 generally of U-shape, provided with a coil 11 wound upon said magnet 10, the terminals of the coil being connected to any suitable direct current supply, which serves as a means to polarize the magnet 10. In the field of the magnet 10, between the north and south poles thereof, as indicated in the drawing, is supported a vibrator rod 12 of any suitable magnetic material. The dimensions of the rod are chosen to give the same a predetermined natural period of vibration. The rod or vibrator 12 is supported in any suitable manner to permit free vibration of the same. Wound around the vibrator 12 is a coil 13, the terminals of which are adapted to be connected to the alternating current source, upon which the oscillator is to exercise control. The coil 13 is dimensioned substantially to enclose the magnetic field produced by 10.

The operation of this device briefly may be described as follows:

The magnet 10 has a normally constant magnetic field due to the flow of direct current through the coil 11. When the rod 12 is placed in the field of the magnet 10 as shown, there is a certain change in dimensions of the rod 12, due to the action of the magnetic field thereon. Now, when alternating current flows through the coil 13 it produces variations in the strength of the field of the magnet 10, thus causing variations in the dimensions of the rod 12. The variations in the dimensions of the rod follow the variations in the effective magnetic field acting thereon, and it therefore follows that if such field is varied periodically, at a certain frequency, the rod will respond and vibrate at that frequency. It has been found that when the frequency of the alternating current flowing through the coil 13 is substantially in resonance with the natural period of mechanical vibration of the rod 12, the rod vibrates at a maximum amplitude and the reaction of the rod upon the alternating current circuit is very powerful. The reaction of the rod at resonance is utilized to give the frequency control when the device is connected to a vacuum tube generator; and for the filter effect when the device is used in a filter circuit. In fact, the electro-mechanical oscillator or resonator may be used for all purposes for which the piezo-electric crystal and magnetostriction oscillator have been used.

Figure 2:
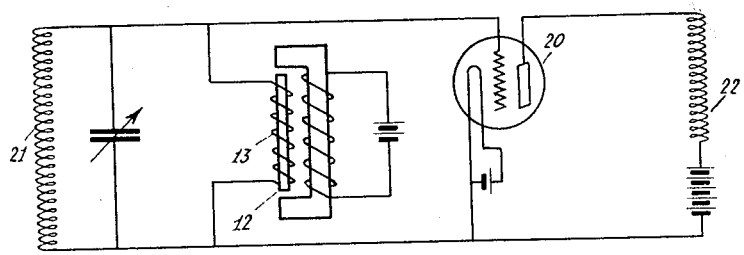
Fig. 2 shows the device of Fig. 1 applied to a vacuum tube device.

Referring to Fig. 2 the electro-mechanical resonator is shown connected to a vacuum tube circuit for the purpose of maintaining the frequency of oscillation of the tube constant. The vacuum tube 20 is provided with the input circuit 21 and output circuit 22 in a manner well understood in the art. The coil 13 of the resonator is connected between the grid and filament of vacuum tube 20. It therefore follows that when the frequency of current flowing in the input circuit of the vacuum tube 20 is in resonance with the mechanical period of vibration of the vibrator rod 12, the latter will react powerfully upon the input circuit and maintain the frequency oscillation of the tube constant.

Figure 3:
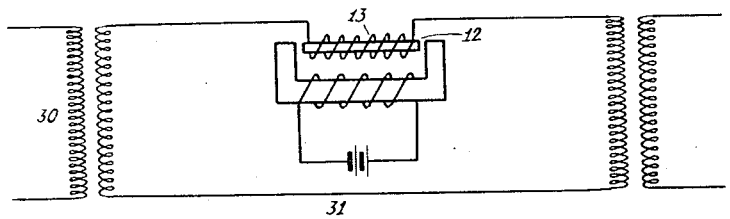
Fig. 3 shows the present invention applied to a filter circuit.

In Fig. 3 there is shown an arrangement whereby the electro-mechanical resonator of the present invention may be utilized in a filter circuit. A primary circuit 30 is coupled to a secondary circuit 31 which includes the coil 13 of the resonator. It will be understood that when the secondary circuit 31 is traversed by a current of a frequency near resonance with the natural period of mechanical vibration of the rod 12, at which the reaction of the rod is equivalent to that of a condenser, the rod 12 will react upon the circuit 31 to balance out its inductance and cause the flow of that particular frequency, thus acting as a filter with respect thereto. The rod 12 may be suitably dimensioned to have the necessary frequency response and sharpness of cut-off.

While there have been disclosed herein certain specific embodiments of the invention, it is to be understood that the scope of the present invention is not limited to the details disclosed, but is limited only to the extent indicated in the appended claims.

Having thus described my invention, what I claim is:

1. In an electro-magnetic resonator having a rod of magnetic material, means to vibrate said rod in the direction of its length, said means comprising a first magnetic device to exert a steady magnetic pull at opposite ends of said rod, and a variable second magnetic device to react upon said first magnetic device to vary the said magnetic pull at opposite ends of said rod where the magnetic flux leaves the rod.

2. In a vacuum tube oscillation generator having an input and output circuit, means connected to only one of said circuits constructed and arranged to maintain the frequency of said generator substantially constant, said means comprising in combination, a magnet, a coil connected to said one circuit and adapted to be traversed by an alternating current which produces a magnetic field, and a vibratory rod mounted in relation to the fields of said magnet and said coil so that said fields together stimulate said rod to vibrate mechanically, said rod producing through said mechanical vibrations an electrical reaction which controls the frequency of said oscillation generator.

3. In a vacuum tube oscillation generator having an input and output circuit, means connected to only one of said circuits constructed and arranged to maintain the frequency of said generator substantially constant, said means comprising in combination, a magnet, a coil connected to said one circuit and adapted to be traversed by an alternating current which produces a magnetic field, and a vibratory rod mounted in relation to the fields of said magnet and said coil so that said fields together stimulate said rod to vibrate mechanically, said rod producing through said mechanical vibrations an electrical reaction which controls the frequency of said oscillation generator.

4. In a vacuum tube oscillation generator having an input and output circuit, means connected to only one of said circuits constructed and arranged to maintain the frequency of said generator substantially constant, said means comprising in combination a rod of magnetic material, means to vibrate said rod in the direction of its length, said means comprising a first magnetic device constructed and arranged to exert a strain at opposite ends of said rod, and a variable second magnetic device constructed and arranged to react upon said first magnetic device whereby to vary the strain at opposite ends of said rod, and to cause the same to vibrate mechanically and to produce through said mechanical vibrations an electrical reaction which maintains substantially constant the frequency of said generator.

5. An electro-mechanical resonator having, in combination, a U-shaped magnet producing a magnetic field, a vibratory element located intermediate the ends of said magnet, said vibratory element being subjected by said field to a magnetic pull at its opposite ends, a coil surrounding said element, and means for applying an alternating current to said coil for producing variations in the length of said element in the direction of said magnetic field.

6. An electro-mechanical resonator having a rod of magnetic material, magnet means at both ends of said rod for exerting by means of a magnetic field a steady electro-mechanical force in the direction of the length of said rod, and circuit means for varying the magnetic field to produce variations in the length of said rod in the direction of said magnetic field by a variation in said electro-mechanical force where the magnetic flux leaves said rod.

7. An electro-mechanical resonator having, in combination, a magnet of substantially U-shaped form, one end of said magnet being of positive polarity and the other end of negative polarity, a longitudinally vibratory element located intermediate the ends of said magnet and physically separated therefrom, said element being subjected by said field to a magnetic pull at its opposite ends, a coil surrounding said element, and means for applying an alternating current to said coil for producing variations in the length of said magnetic field.

8. In combination, a rod of magnetic non-magnetostrictive material, said rod having free ends and being so dimensioned as to have a natural period of mechanical vibration, corresponding to a desired frequency of operation, in the direction of its longitudinal axis, means causing a steady magnetic field to flow through one end of said rod and out of the other end of said rod whereby said rod is subjected to a mechanical stress applied substantially at the ends thereof where said field flows into and out of said rod, said stress acting in the direction of the longitudinal axis of said rod, and separate means varying the field flowing into and out of said rod at a frequency substantially corresponding to said natural period whereby the mechanical stressing of said rod is correspondingly altered and said rod vibrates mechanically along its longitudinal axis at a frequency corresponding to its natural frequency of longitudinal vibration.

9. The combination of apparatus as claimed in claim 8 wherein the means for varying the field through said rod comprises a coil about said rod and wherein in addition there is provided a vacuum tube having a plurality of electrodes, said coil having its ends operatively connected to two electrodes of said vacuum tube.

10. The combination as claimed in claim 8 wherein the means for varying the field flowing through said rod comprises a coil about said rod and wherein there is provided in addition an electron discharge device having an anode, a cathode and a grid, the ends of said field varying coil being operatively connected to the grid and cathode of said electron discharge device.

11. The combination as claimed in claim 8 wherein said magnetic field varying means comprises a coil about said rod and wherein in addition there is provided an electron discharge device having a plurality of electrodes; and, a resonant circuit, the ends of said coil being operatively connected to two electrodes of said device, and, said resonant circuit also being operatively connected to two electrodes of said device.

12. The combination as claimed in claim 8 wherein said field varying means comprises a coil about said rod, and wherein in addition there is provided a vacuum tube having an anode, a cathode and a grid; and, a resonant circuit, said resonant circuit being connected between said grid and cathode of said tube, and said coil being connected across said resonant circuit.

CLARENCE W. HANSELL.